G. H. SHERINGHAM.
ARTIFICIAL ILLUMINATION.
APPLICATION FILED JAN. 31, 1920.
1,391,585.
Patented Sept. 20, 1921.
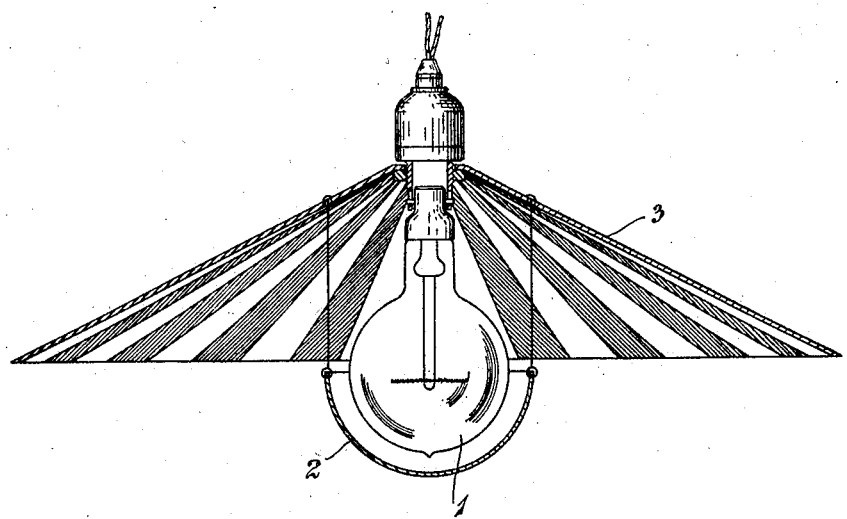
INVENTOR
George Henry Sheringham
BY
ATTORNEYS

UNITED STATES PATENT OFFICE.

GEORGE HENRY SHERINGHAM, OF LONDON, ENGLAND.

ARTIFICIAL ILLUMINATION.

1,391,585.        Specification of Letters Patent.    Patented Sept. 20, 1921.

Application filed January 31, 1920. Serial No. 355,489.

*To all whom it may concern:*

Be it known that I, GEORGE HENRY SHERINGHAM, artist, of 1 Clanricarde Gardens, Bayswater, London, W. 2, England, a subject of the King of Great Britain, have invented new and useful Improvements in Artificial Illumination; and I do hereby declare the following to be a full, clear, and exact description of the same.

This invention relates generally to artificial illumination and in particular to means whereby the quality of light derived from artificial sources may be made to be substantially equivalent to daylight.

It is well known that all artificial lights differ considerably in quality from daylight with the result that colors and pigments viewed by such artificial lights present an appearance very different from that which they present in ordinary daylight. The appearance of the colors varies also with different kinds of artificial light.

Various methods have from time to time been proposed for overcoming this defect, most of them involving the use of transparent screens or filters colored to absorb such rays as are found in excess in the artificial light in comparison with the spectrum of artificial daylight. It has however been found impossible to produce an effect sufficiently comparable with daylight for practical purposes by the use of a single absorption color. The main object of my invention is to obtain a more complete correction than heretofore and this is achieved by employing as the compensating or correcting member an opaque reflector having its reflecting surface colored with two or more colors which are applied in such proportional areas as to absorb the correct proportional quantities of the energy of the various light rays which are present in excess in the artificial light in comparison with daylight.

A further object of the invention consists in combining together the rays which are reflected after absorption of the superfluous rays and this is achieved partly by the fact that the compensating member is a reflector as distinct from a light transmission screen and partly by the fact that the reflector is vari-colored *i. e.* has each of the colors applied to a plurality of small areas dispersed substantially uniformly over the reflecting surface. By this means not only is a uniform correction of the artificial light obtained, but also the reflected and corrected rays are thoroughly intermingled so that the light thrown by the reflector onto an object to be illuminated is of a uniform, as distinct from being of an irregular or patchy, quality substantially equivalent to daylight.

The colors applied to the reflector are preferably chemicals which possess simple absorption spectra, as methyl violet (anilin dye), and benzol green.

The arrangement may be such that the whole of the light arising from the artificial source may be reflected by the compensating member, or only a part thereof may be so reflected and the rest acts directly.

In carrying out my invention the first step is to determine the distribution of intensity in the spectrum of the artificial light to be corrected. This may be done by spectro-photometric methods which are now well-known from the work of Glazebrook, Nutting and others. This distribution of intensity is then compared with that in the spectrum of average daylight, and the comparison makes it possible to calculate mathematically the energy absorption of the various wave lengths required to produce a distribution of intensity corresponding to that of the daylight spectrum. Suitable colors for use on the reflector can then be selected by a careful consideration of curves and figures of the absorption and percentage reflection of different colors and pigments when applied to a suitable surface in a known degree of concentration. Very accurate spectro-photometric methods for this purpose are outlined in Sir William Abney's book on "*Researches in Colour Vision*" especially with regard to the color patch apparatus. Having plotted the curves of the colors selected their combination curve can be readily ascertained. Knowing the amount of correction necessary in the distribution of intensity in the spectrum of the artificial light as compared with daylight, the necessary proportional areas of the selected colors can be approximately estimated and finally accurately determined by simple mathematical methods and graphically recorded.

As by my invention I propose to provide a means for correcting artificial lights of various kinds and as the amount and kind of correction required varies with different sources of artificial light, it follows that the selection of colors and their proportional areas will vary for different artificial lights.

In applying my invention to an ordinary incandescent electric lamp, I make use of a reflector or shade which may be of the usual conical form and is suitably colored on its reflecting surface so as to act as a reflecting compensating member. A lamp of this nature usually alters the hue of such colors as violet, blue and green and the compensating member used in combination with such lamps would be colored with two or more of these colors in such proportion and concentration as to absorb a suitable proportion of the excessive rays while reflecting the feeble rays present in the spectrum of the lamp light. In a case when the resultant light is partly direct and partly reflected, it is necessary in order to counterbalance as far as possible the unavoidable lack of balance in the quality of the direct light, to cause the reflected light to be compensatingly out of balance in the reverse direction. In other words the proportion and concentration of the colors on the reflector are so chosen that the reflected light has, in comparison with daylight a greater relative proportion of the rays which are feeble in the direct light. The colors may be arranged upon the reflecting surface of the shade in suitable lines or patterns and the meeting edges of the different colors may be serrated.

In order that my invention may be fully understood and readily carried into practice I have appended hereunto one sheet of drawings wherein the figure is a view in side elevation partly in section.

My invention is particularly applicable to nitrogen filled tungsten electric lamps such as are illustrated in the drawing. In applying my invention to a lamp 1 such as shown, I preferably provide a lower reflecting member 2 which is opaque and adapted to prevent any direct rays from the lamp 1 from reaching the object to be illuminated. The upper side of the member 2 is of a reflecting nature and may be either of polished metal or silvered. Above the lamp is provided a reflector 3 which may be either conical as shown, or flat, or of any other suitable shape. As will be seen from the drawing the upper reflecting surface of the member 2 is adapted to throw the light up on to the underside of the reflector 3. This underside reflecting surface of the member 3 is colored in any suitable way with colors which are selected and applied in definite proportional areas as hereinbefore described.

The opaque lower reflector 2 may if desired be of such a shape and size, and may be so arranged as to fit closely against the lower surface of the bulb of the lamp 2, instead of being spaced apart therefrom as shown in the drawing. According to a further modification the lower surface of the lamp bulb itself may be adapted to act as an opaque reflector as by being silvered and blacked on its inner and or outer surfaces.

In connection with nitrogen filled tungsten lamps I have found that the following colors and proportions imitate most nearly the distribution of intensity in the spectrum of average daylight.

1 part by area vermilion.
6 parts by area emerald green.
6 parts by area ultramarine.

I have, however, also determined by experiment that the following colors and proportions of area produce an effect which makes the light of the lamp resemble daylight to the eye somewhat more nearly than the colors and proportions given above.

1 part by area methyl violet.
1 part by area ultramarine.
1 part by area emerald green.

The colors can be applied by any method, such as, staining, printing, painting or attaching colored sheets of suitable material such as paper or fabric.

It will be understood that my invention may be carried out, as hereinbefore explained, without the use of a lower opaque reflector such as 2. The quality of the resultant artificial light may, for instance be improved by simply providing a colored reflecting surface above the light, the colors being selected and arranged as hereinbefore indicated. In such a case the object will be illuminated partly by direct rays from the source of the light and partly from the reflected rays from the colored reflector. The effect of such an arrangement is inferior to the effect of an arrangement in which the whole of the rays are reflected from the tinted reflector.

What I claim is:—

1. An artificial lighting unit comprising in combination an artificial source of light and an opaque reflector having on its reflecting surface a plurality of colors in small areas and uniformly disposed on the entire surface, the colors being such as selectively to absorb energy of light rays in the artificial light which possess excessive intensity, and the total areas occupied by said colors being such as to absorb the energy of said rays in such proportion as to produce in the spectrum of the resultant light a distribution of intensity substantially corresponding to that in the spectrum of daylight.

2. An artificial lighting unit comprising in combination an artificial source of light, an opaque reflector having on its reflecting surface, a plurality of colors in small areas and uniformly disposed on the entire surface, the colors being such as selectively to absorb energy of light rays in the artificial light which possess excessive intensity, and the total areas occupied by said colors being such as to absorb the energy of said rays in such proportion as to produce in the spectrum of the resultant light a distribution of intensity substantially corresponding to that in the spectrum of daylight and a plain opaque reflector adapted to screen the direct light from the source and to reflect it onto the vari-colored reflecting surface of the reflector.

3. In a reflector of the character described, a main opaque conical reflector having on its reflecting surface a plurality of colors disposed on its entire surface in small areas, and a second reflector suspended from the main reflector, said second reflector being opaque and reflecting the rays of light on the main reflector.

In testimony whereof I affix my signature in presence of two witnesses.

GEORGE HENRY SHERINGHAM.

Witnesses:
CHARLES S. PARSONS,
S. A. HEART.